(12) United States Patent
Walker

(10) Patent No.: US 8,800,682 B2
(45) Date of Patent: Aug. 12, 2014

(54) DUST EXTRACTION FOR POWER TOOLS

(75) Inventor: Andrew Walker, Durham (GB)

(73) Assignee: Black & Decker Inc., Newark, DE (US)

( * ) Notice: Subject to any disclaimer, the term of this patent is extended or adjusted under 35 U.S.C. 154(b) by 377 days.

(21) Appl. No.: 12/896,319

(22) Filed: Oct. 1, 2010

(65) Prior Publication Data

US 2012/0080206 A1    Apr. 5, 2012

(51) Int. Cl.
- *B24B 55/06* (2006.01)
- *B24B 55/10* (2006.01)
- *B24B 23/04* (2006.01)
- *B23Q 11/00* (2006.01)
- *B24B 23/02* (2006.01)

(52) U.S. Cl.
CPC ............... *B24B 55/10* (2013.01); *B24B 23/04* (2013.01); *B23Q 11/0046* (2013.01); *B24B 23/028* (2013.01)
USPC ............ 173/198; 173/199; 173/217; 173/104

(58) Field of Classification Search
USPC ............ 173/198–199, 217, 104; 30/124, 133; 451/546, 453
See application file for complete search history.

(56) References Cited

U.S. PATENT DOCUMENTS

| | | | |
|---|---|---|---|
| 2,336,004 A * | 12/1943 | Fowler | 451/355 |
| 2,469,296 A | 5/1949 | Farrell et al. | |
| 4,549,371 A * | 10/1985 | Hakoda | 451/456 |
| 5,074,044 A | 12/1991 | Duncan | |
| 5,224,230 A * | 7/1993 | Vanicsek et al. | 7/158 |
| 5,890,292 A * | 4/1999 | Stark et al. | 30/124 |
| 6,827,640 B2 | 12/2004 | Burns et al. | |
| 6,848,985 B2 * | 2/2005 | Lamprecht et al. | 451/453 |
| 7,223,161 B2 * | 5/2007 | Kodani et al. | 451/354 |
| 2008/0153406 A1* | 6/2008 | Melvin et al. | 451/456 |

FOREIGN PATENT DOCUMENTS

| | | |
|---|---|---|
| DE | 3715350 | 11/1988 |
| EP | 1661661 | 5/2006 |
| GB | 2433711 | 7/2007 |

\* cited by examiner

*Primary Examiner* — Michelle Lopez
(74) *Attorney, Agent, or Firm* — Stephen R. Valancius

(57) ABSTRACT

A power tool with a working head for holding a working element. The power tool includes a motor having a motor output shaft for driving said working element and a duct having an inlet locatable in proximity to a point of contact between the working element and a workpiece. A dust collection chamber has an inlet in fluid communication with an outlet from said duct, and an outlet in fluid communication with atmospheric air. A fan is operable to transport air from the inlet of said duct to the inlet of said dust collection chamber. A first drive wheel is mounted on the motor output shaft. A second, driven, wheel mounted on a second shaft and a drive belt connects the first, drive wheel to the second, driven wheel, for transmitting power from the motor output shaft to the second shaft. The fan is mounted on the second shaft.

21 Claims, 11 Drawing Sheets

DUST EXTRACTION FOR POWER TOOLS

BACKGROUND OF THE INVENTION

The present invention concerns dust extraction for power tools, and more particularly dust extraction for power tools of the hand-holdable variety, such as sanders, drills, routers, saws, hammers, grinders and the like. Typically, these power tools generate sawdust when applied to a workpiece made of wood.

The dust generated when such tools are used is of a fine particulate nature and floats easily into surrounding air under normal operating conditions. Vibrations associated with the operation of said tools also tend to disperse this dust still further. A working environment containing suspended dust is unpleasant, inconvenient and may even be unhealthy for users of these tools. Moreover, once the dust has settled, a clean-up operation is also required to remove the scattered dust from the environment. In view of these problems, a number of prior art arrangements have already been developed for extracting dust from around the operating region of power tools.

SUMMARY OF THE INVENTION

According to one aspect, the present invention provides a power tool comprising: a working head for holding a working element; a motor having a motor output shaft for driving said working head; a duct having an inlet locatable in proximity to a point of contact between the working element and a workpiece; a dust collection chamber having an inlet in fluid communication with an outlet from said duct, and an outlet in fluid communication with atmospheric air; and a fan operable to transport air from the inlet of said duct to the inlet of said dust collection chamber; wherein the dust collection chamber has a substantially circular cross section about an axis, the inlet to the dust collection chamber being at the perimeter of said circle and the outlet of said dust collection chamber being drawn from within said circle, in the region of said axis; the power tool further comprising: a first, drive wheel mounted on the motor output shaft; a second, driven wheel mounted on a second shaft; and a drive belt connecting the first, drive wheel to the second, driven wheel, for transmitting power from the motor output shaft to the second shaft; wherein the fan is also mounted on the second shaft.

Thus, the shape of the dust collection chamber and the arrangement of the inlet thereto and the outlet therefrom ensure that dust is extracted from dust-laden air entering the chamber in a cyclonic fashion. Moreover, since the fan which is operable to transport air from the inlet of the duct to the inlet of the dust collection chamber is not mounted on the motor output shaft, but rather on a second shaft, the fan may be placed in a location out of the path of dust-laden air from the working head to the dust collection chamber, for example at the outlet from the dust collection chamber to atmospheric air, where the dust-laden air has already been cleaned and possibly also filtered. This clean fan operation obviates the risk of the fan becoming clogged. In addition, since the rate of rotation of the fan is decoupled from the rate of rotation of the motor by the presence and intervening operation of the first, drive and second, driven wheels, and the drive belt connecting them, the rate of rotation of the fan may also be optimised for the throughput of dust-laden air through the dust extraction system, regardless of the rate of rotation of the motor which drives the working head.

In one embodiment, however, the power tool also comprises a filter located in fluid flow between the inlet of the dust collection chamber and atmospheric air, wherein the filter is located centrally within the dust collection chamber coaxially with the axis of the dust collection chamber. This has the advantage that as well as being subjected to cyclonic separation, dust-laden air entering the dust collection chamber is also filtered before being expelled to atmosphere.

The first, drive wheel may have a larger diameter than the second, driven wheel. This enables the rate of rotation of the fan also mounted on the second shaft to be increased according to the ratio of the diameters of the drive and driven wheels, thereby also increasing the airspeed through the dust extraction system and the rate of rotation of dust-laden air within the dust collection chamber. In such a case, the ratio of the diameters of the first, drive and second, driven wheels and the rate of rotation of the fan may be made so great that true cyclonic separation of dust is achieved within the dust collection chamber and the need for a filter before the air is expelled to atmosphere may be dispensed with.

The power tool may also be provided with another fan mounted on the motor output shaft and operable to cool the motor, the other fan being contained in a chamber of the power tool which is sealed from fluid communication with the duct of the dust extraction system, but which is in fluid communication with atmospheric air via a vent. This allows the motor to be cooled by air drawn in through the vent without admitting dust into the chamber which would clog the motor and might cause it to fail.

The working head may be provided with a quick-release mechanism of a conventional type for holding a working element, allowing the working element to be mounted to and dismounted from the working head quickly and easily. In such a case, a bottom portion of the dust collection chamber is advantageously provided with a clearance above a lower surface of the working head so as not to interfere with operation of the quick-release mechanism.

The first, drive wheel, the second, driven wheel and the drive belt may be contained within a compartment of a main body of the power tool, wherein the compartment has a removable cover. This allows these components of the dust extraction system to be accessed quickly and easily and for the drive belt to be replaced easily, in case it should break or become detached from the first and second wheels. Such an arrangement also helps in the assembly of a power tool according to the invention during manufacture. Conveniently, the main body of the power tool is provided with mounting parts for receiving the cover of this compartment in a snap-fit manner.

If the first and second wheels are located quite far apart, the power tool may also be provided with an idler wheel located between the first, drive wheel and the second, driven wheel to guide the drive belt therebetween. This helps to ensure that the drive belt does not become accidentally detached from the first and second wheels.

The axis of the dust collection chamber may also be oriented at an oblique angle with respect to an axis defined by the motor output shaft. This has the advantage of making the power tool more compact. The axis of the dust collection chamber may also be oriented substantially horizontally. In such a case, the power tool may further comprises a pulley about which the drive belt is able to pass from a horizontal to a vertical orientation. This allows the components of the power tool, such as the dust collection chamber, the main body of the power tool and the working head to be arranged as desired in a configuration which is most ergonomic for a user.

BRIEF DESCRIPTION OF THE DRAWINGS

Further features and advantages of the present invention will be apparent from the followed detailed description, which is given by way of example and in association with the accompanying drawings, in which.

Figure 1:
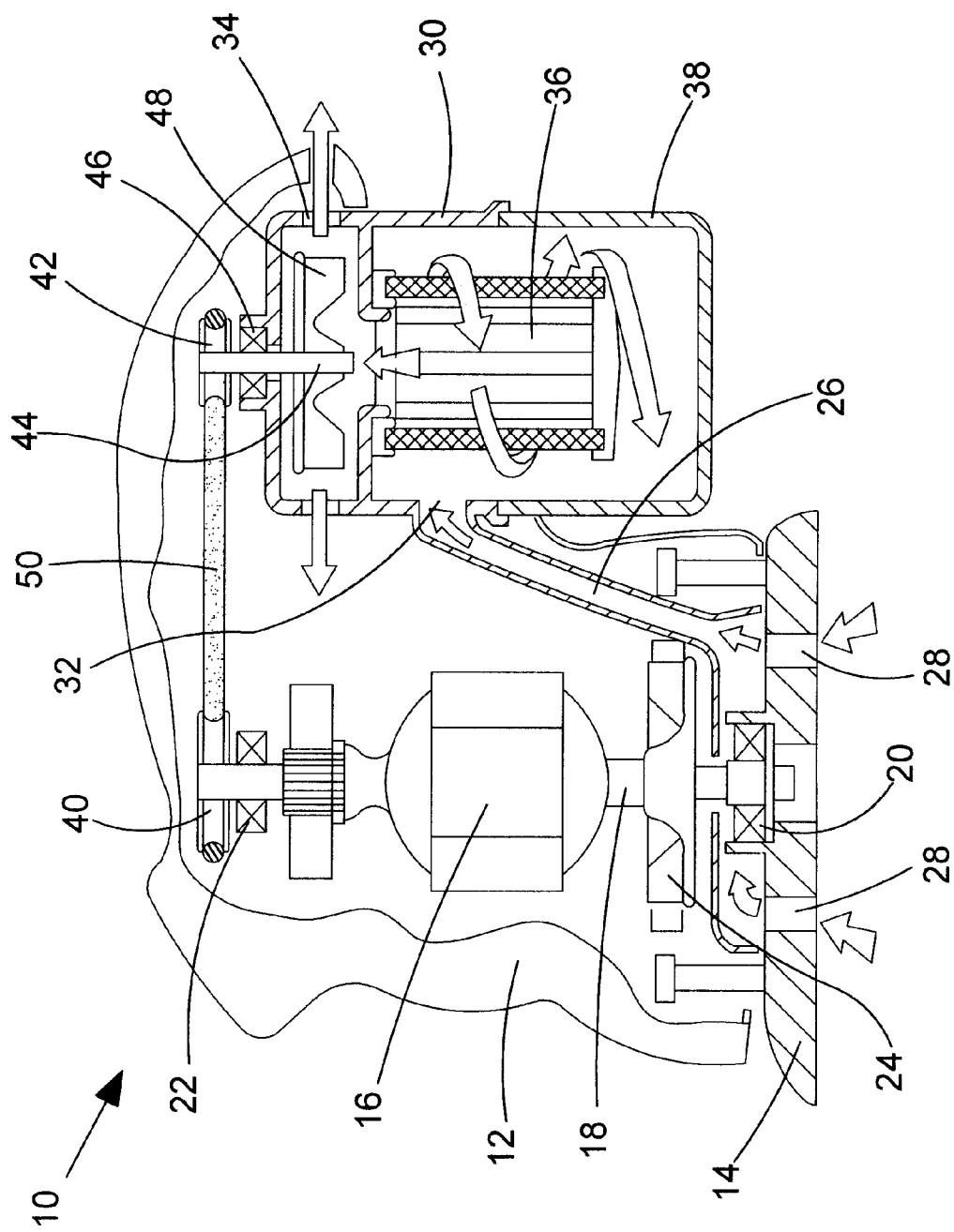
FIG. 1 is a partially cut-away schematic view of a first side of a sander having a dust extraction system, which is a power tool according to a first embodiment of the invention.

Referring firstly to FIG. 1, there is shown a power tool 10, which in this embodiment is a sander, having a main body portion 12 and a working head 14, here a platen, for holding a working element, namely a sheet of sandpaper. The main body portion 12 houses a motor 16 mounted on a shaft 18 held between two bearings 20, 22. Also mounted on shaft 18 is a first fan 24 for providing a flow of cooling air to motor 16 via air vents 56 (not shown in FIG. 1—see FIG. 2) located in main body portion 12. A duct 26 has an inlet locatable in close proximity to the point of contact between the sheet of sandpaper and a workpiece by the provision of through-holes 28 formed in the platen 14 in a conventional manner. A dust collection chamber 30 has an inlet 32 in fluid communication with an outlet from said duct 26, and an outlet 34 in fluid communication with atmospheric air. The dust collection chamber 30 is substantially in the shape of a cylinder having a longitudinal axis oriented substantially vertically with respect to the power tool; the inlet 32 to the dust collection chamber is located on the curved surface of the cylinder, and the outlet 34 of the dust collection chamber is located around the circumference of the cylinder, above the inlet 32. Within the dust collection chamber 30 is a filter 36 also substantially in the shape of a cylinder with its longitudinal axis oriented substantially vertically with respect to the power tool and coaxially with the dust collection chamber. The dust collection chamber also comprises a removable cover 38 on a bottom portion thereof, which allows the dust collection chamber to be opened and emptied by a user of the sander.

The dust extraction system in the sander of FIG. 1 comprises a first, drive wheel 40 mounted on shaft 18 and a second, driven wheel 42 mounted on one end of a second shaft 44 held by a bearing 46. Mounted at the other end of second shaft 44 is a second fan 48. A drive belt 50 is stretched between and around the first, drive wheel 40 and the second, driven wheel 42, such that when the drive shaft 18 of motor 16 rotates, drive wheel 40 also rotates, and the rotation of drive wheel 40 is transmitted to driven wheel 42 by drive belt 50, causing second shaft 44 to rotate in bearing 46 and therefore second fan 48 mounted on shaft 44 to rotate as well. Fan 48 is located in fluid communication between an interior region of filter 36 and clean air outlet 34. Thus, dust-laden air is drawn by the rotation of fan 48 into duct 26 through holes 28 formed in platen 14, following the direction of the arrows indicated in FIG. 1, and into the inlet 32 of dust collection chamber 30. Here, the dust-laden air swirls around the exterior of filter 36 in a cyclonic fashion, where dust is flung against the interior curved surface of dust collection chamber 30 and falls under the influence of gravity into the bottom portion 38 of dust collection chamber 30. Meanwhile, clean air is drawn through the curved surface of filter 36 and passes up the interior region thereof to fan 48, which flings the filtered air out through clean air outlet 34. The diameter of the first, drive wheel 40 is made larger than that of the second, driven wheel 42, so that as the motor drive shaft 18 rotates, fan 48 is caused to rotate at a higher speed, according to the ratio of the diameters of the drive and driven wheels 40, 42.

Figure 2:
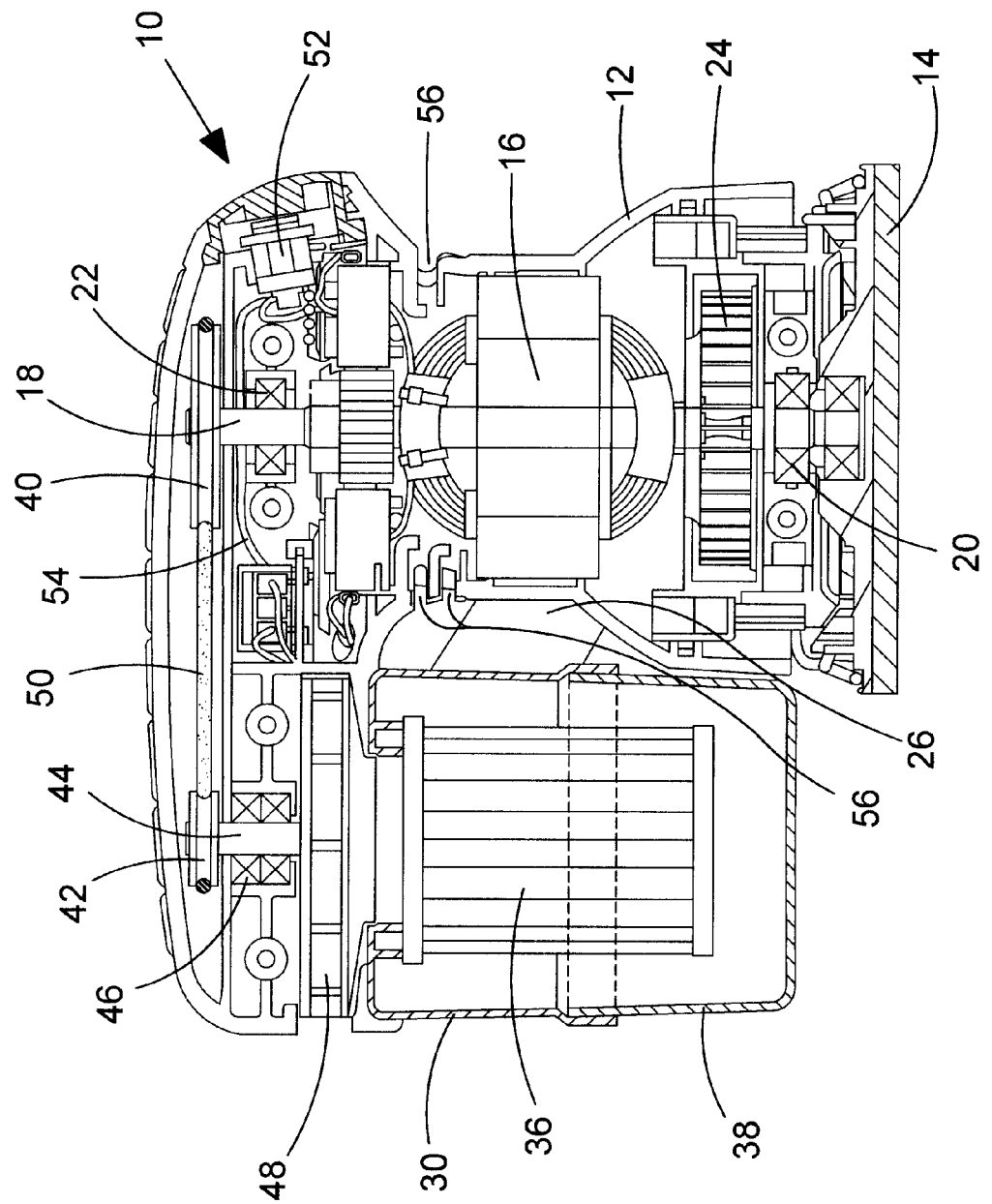
FIG. 2 is a more detailed sectional view of the opposite side of the sander shown in FIG. 1.

FIG. 2 is a more detailed sectional view of the opposite side of the sander shown in FIG. 1, from which it can be seen how other conventional components of this power tool, such as an electrical on/off switch 52 and electrical wiring 54 are also housed within main body 12. FIG. 2 also shows the air vents 56 located in main body 12, whereby first fan 24 draws air in to cool motor 16.

Figure 3:
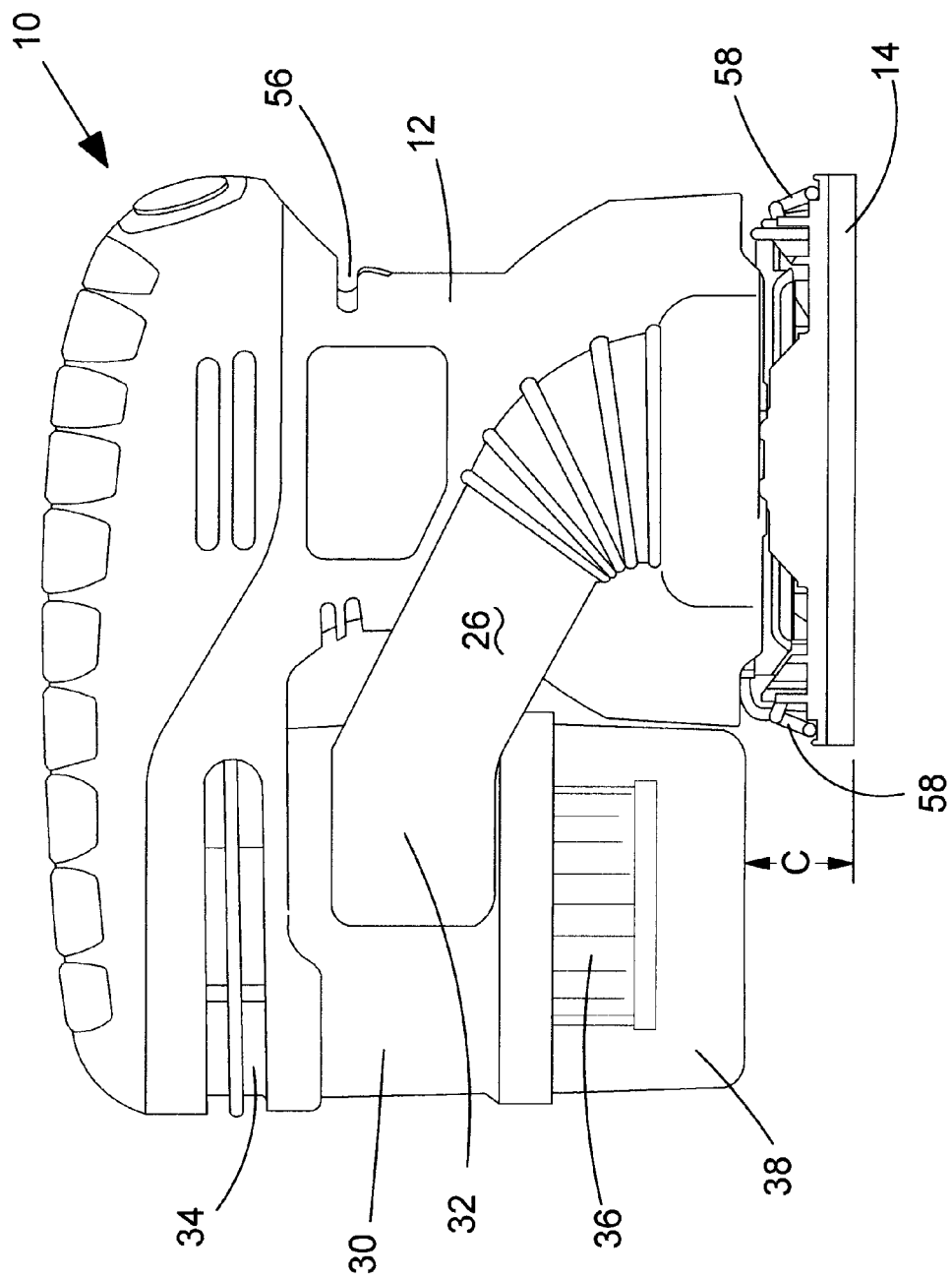
FIG. 3 is an external elevational view of the first side of the sander of FIG. 1.

FIG. 3 is an external elevational view of the first side of the sander shown in FIG. 1, giving a clearer view of duct 26, and the inlet 32 from duct 26 to dust collection chamber 30, as well as the clean air outlet 34 therefrom. FIG. 3 also shows clearly how the bottom portion 38 of dust collection chamber 30 is provided with a clearance, labelled "C" in FIG. 3 above the lower surface of platen 14 to allow sandpaper easily to be mounted and dismounted to platen 14 via quick-release mechanism 58, without interference from the bottom portion 38 of dust collection chamber 30.

Figure 4:
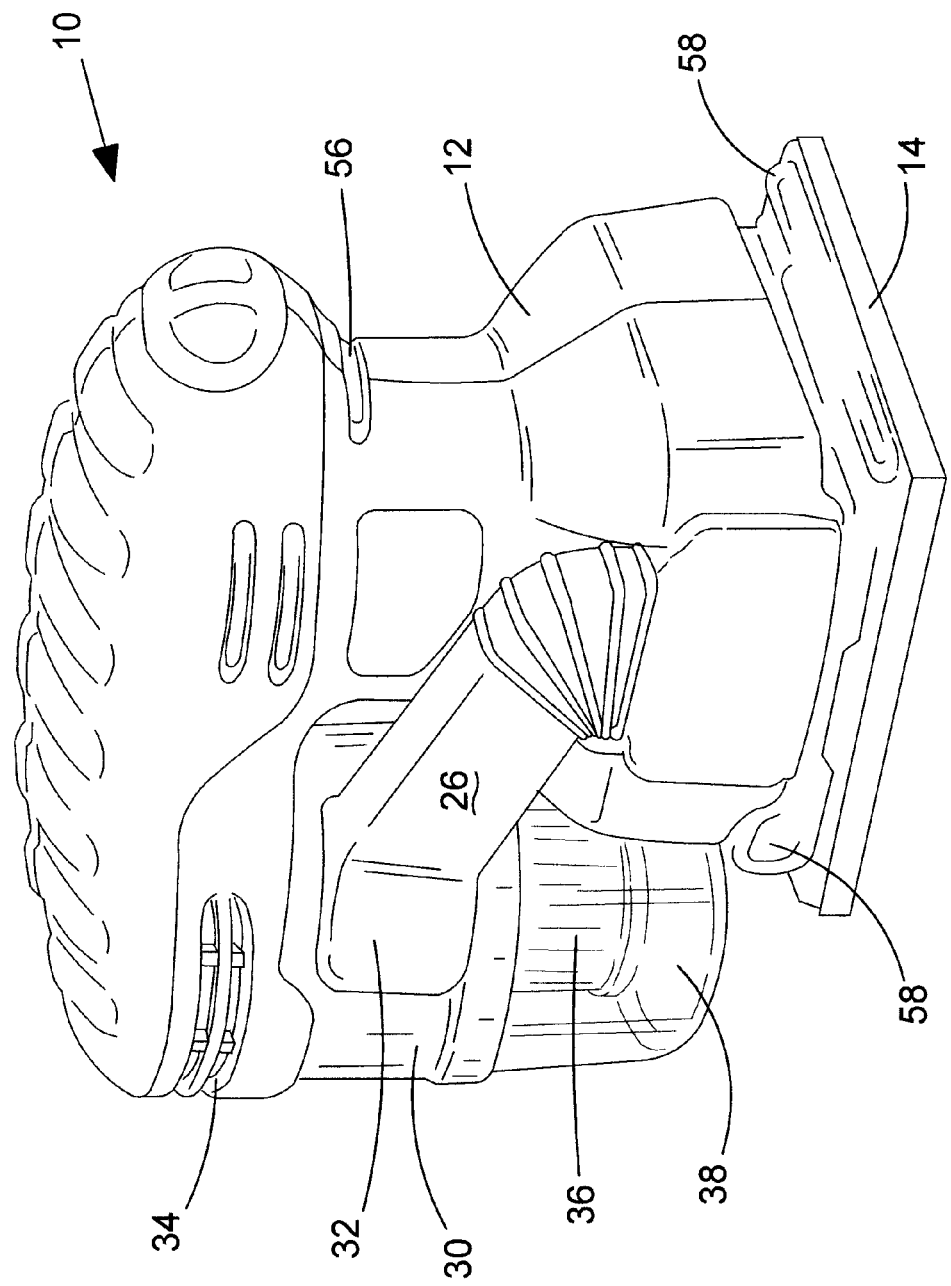
FIG. 4 is a perspective view of the sander of FIG. 1.

FIG. 4 is a perspective view of the same sander 10, showing similar features to those visible in FIG. 3. FIG. 4 also clearly demonstrates how filtered air ejected from clear air outlet 34 is expelled in a horizontal plane, and therefore does not disturb dust lying on a workpiece with which the platen 14 of the sander 10 is in contact, or blow upwards into the face of a user.

Figure 5:
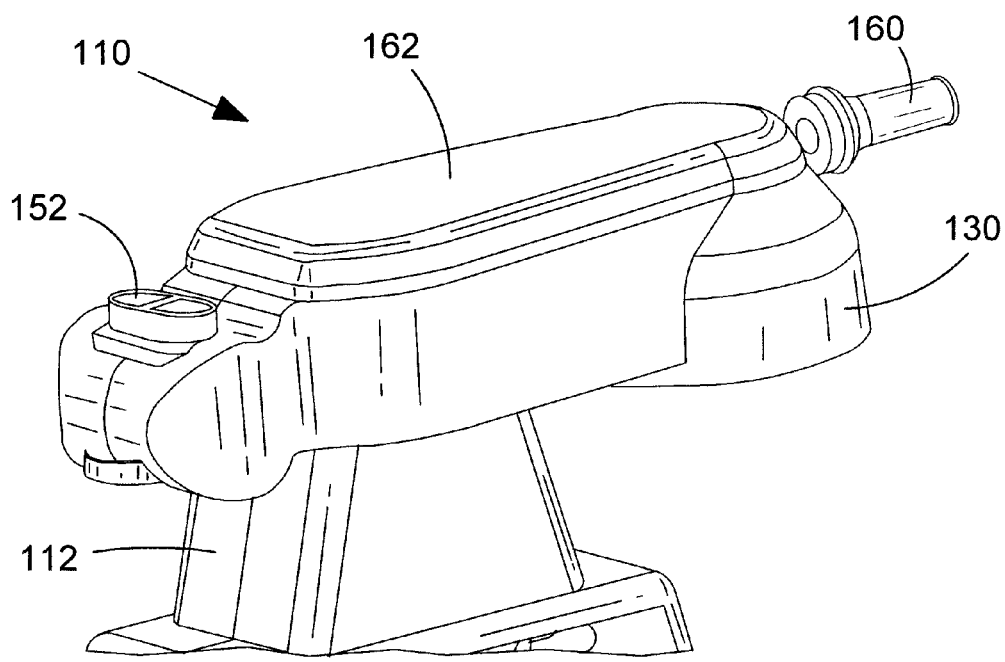
FIG. 5 is a partial perspective view of the top portion of a sander having a dust extraction system, which is a power tool according to a second embodiment of the invention.
Figure 6:
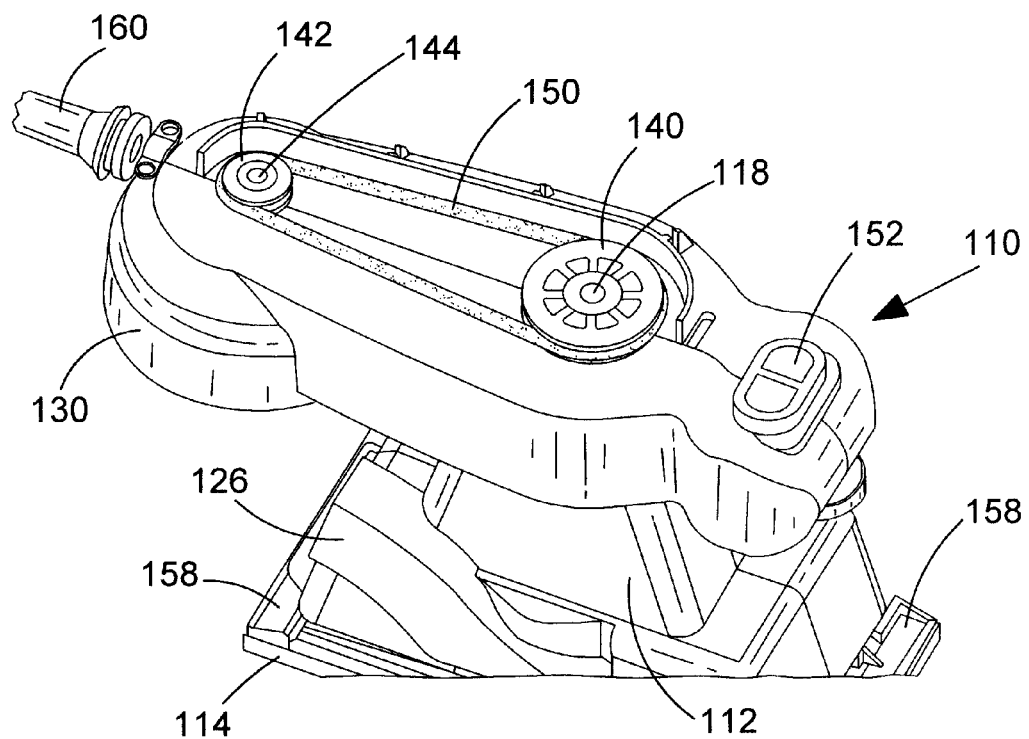
FIG. 6 is a view from above and one side of the top portion of the sander of FIG. 5 with a cover thereof removed.
Figure 7:
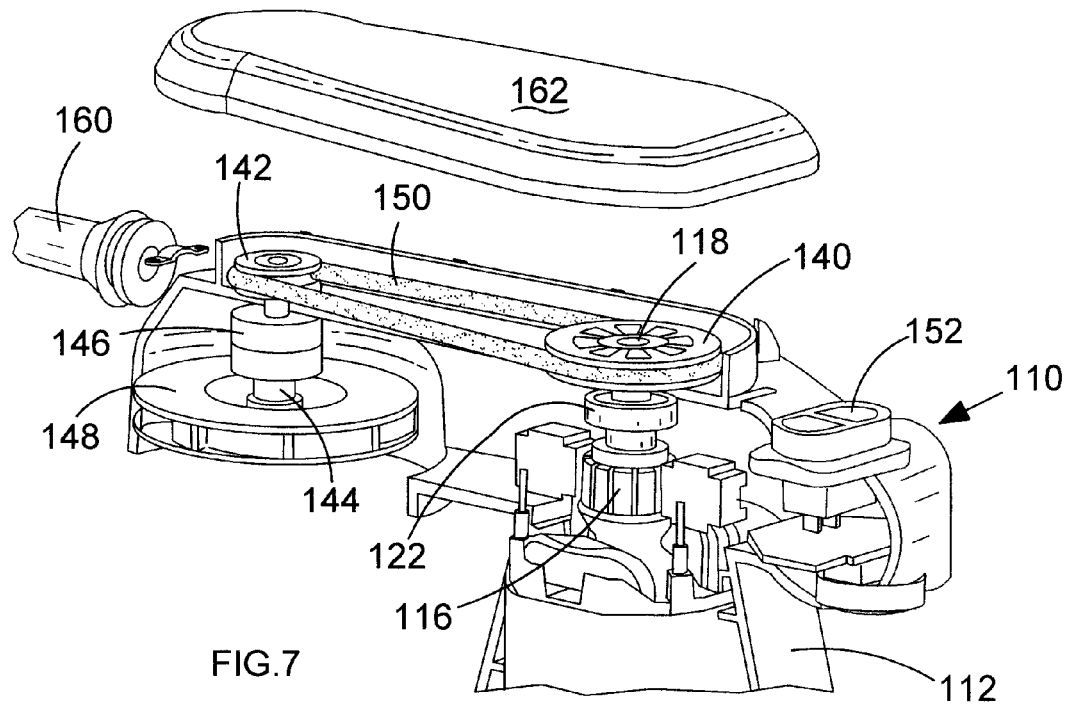
FIG. 7 is an exploded cut-away view of the top portion of the sander of FIG. 5.
Figure 8:
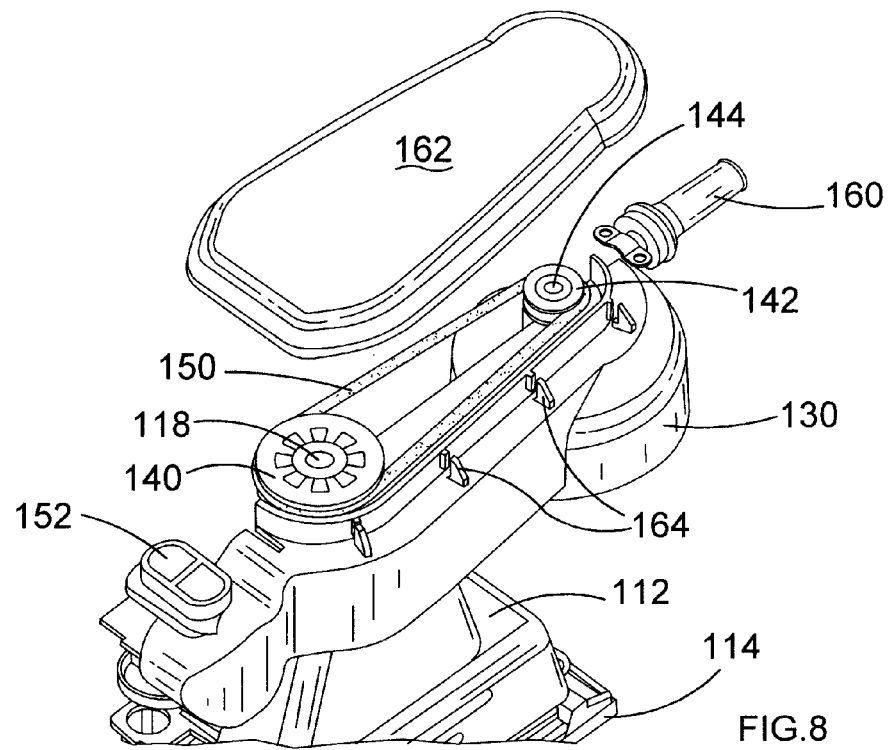
FIG. 8 is the same as FIG. 7, but seen from the other side thereof.

FIGS. 5 to 8 show a sander 110 according to a second embodiment of the invention, in which figures, features corresponding to those already described above in relation to the embodiment shown in FIGS. 1 to 4 are labelled with like reference numerals, increased by 100. Thus, FIG. 5 shows the top portion of a sander 110 having a main body portion 112 surmounted by an electrical on/off switch 152. Electrical power to sander 110 is supplied via electrical cable inlet 160. On top of sander 110 is a cover portion 162, which forms a separate component of main body portion 112 of sander 110 during manufacture. FIG. 6 shows the top of sander 110 with this cover 162 removed, from which it can be seen that cover 162 conceals a compartment which contains first drive wheel 140 mounted on motor drive shaft 118, second drive wheel 142 mounted on second shaft 144 and drive belt 150. This makes the dust extraction system of sander 110 particularly easy to assemble during manufacture of this power tool, since the main components of sander 110, such as a motor, first fan for cooling the motor, electrical wiring and electrical on/off switch, may be mounted within main body 112 before the components of the dust extraction system, such as the first and second wheels 140, 142 and drive belt 150, are mounted in the compartment concealed by cover 162. It also allows the replacement of drive belt 150 with great ease, in the event that drive belt 150 breaks and that the transmission of power from motor drive shaft 118 to second shaft 144 is lost, simply by the removal of cover 162, without having to open up the main body 112 of sander 110. To this end, and as may be seen best in FIG. 8, main body 112 is provided with mounting parts 164 for receiving cover 162 in a snap-fit manner. FIG. 8 also clearly shows the difference in the diameters of drive wheel 140 and driven wheel 142, whereby the speed of rotation of second shaft 142 is increased relative to that of motor drive shaft 118, according to the ratio of their diameters.

Figure 9:
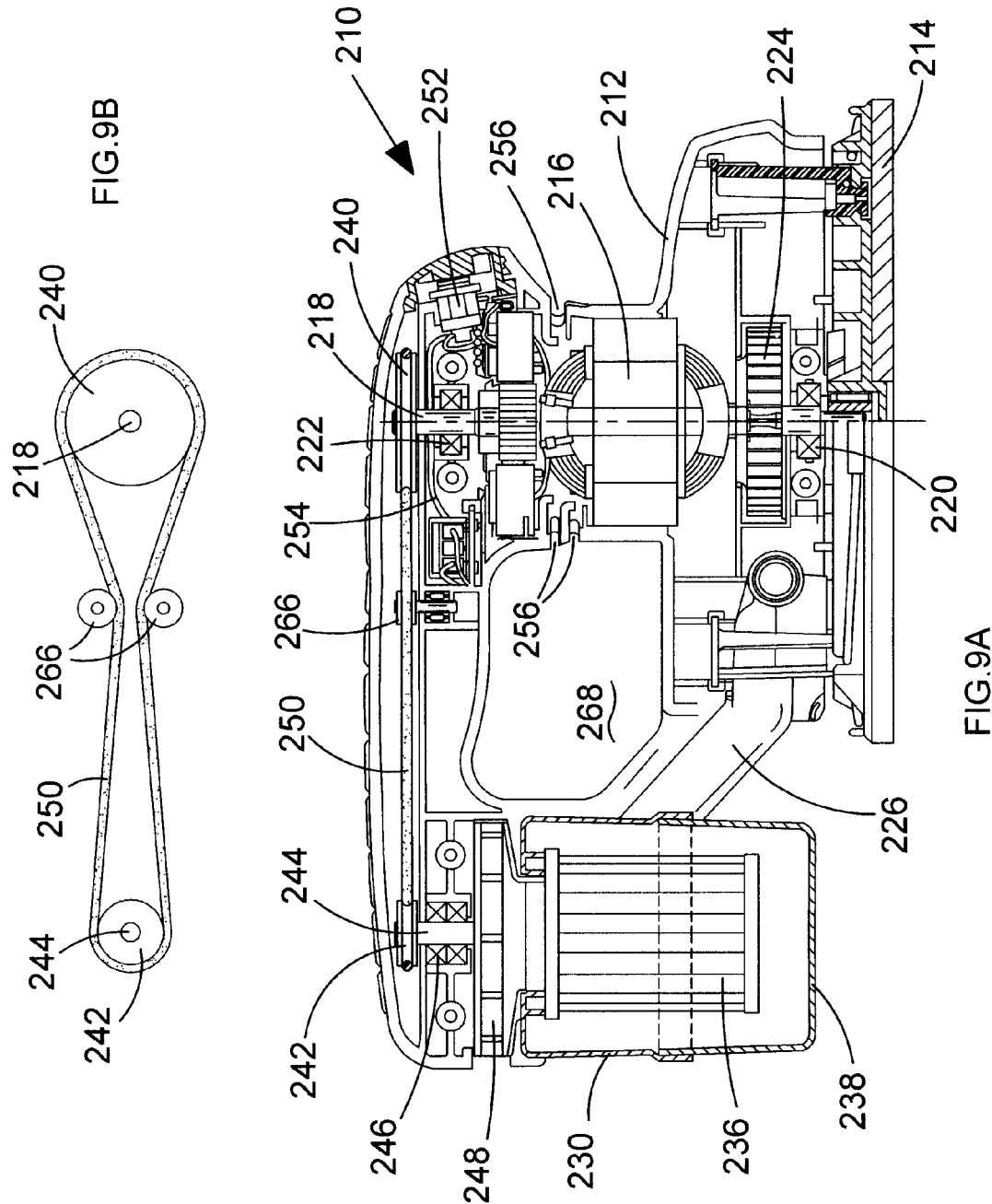
FIG. 9A is a sectional view through the side of a sander having a dust extraction system, which is a power tool according to a third embodiment of the invention.
FIG. 9B is a top-plan view of some components of the dust extraction system of the sander shown in FIG. 9A.
Figure 10:
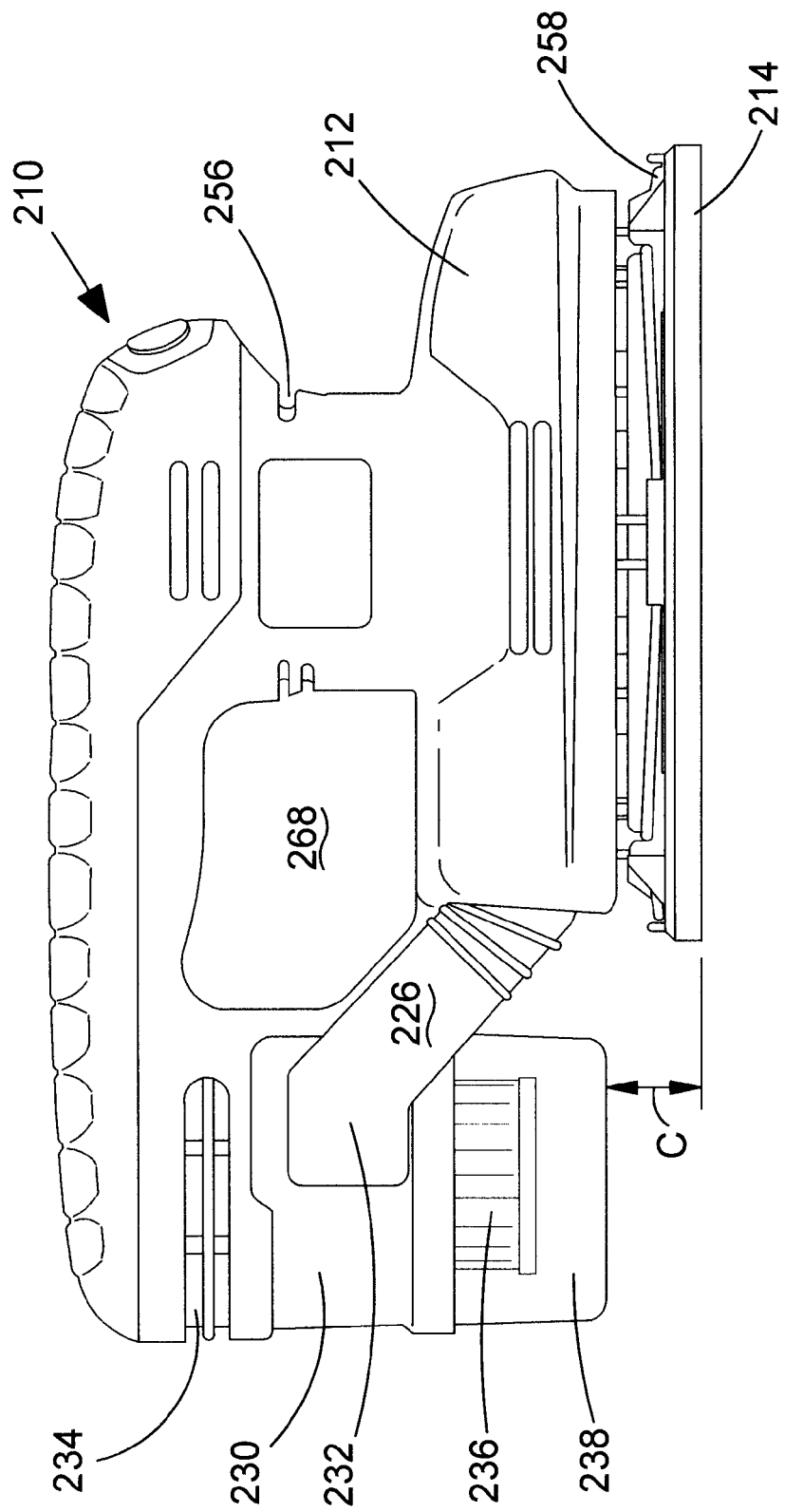
FIG. 10 is an external elevational view of the side of the sander shown in FIG. 9A.

FIGS. 9A, 9B and 10 show a sander 210 according to a third embodiment of the invention, in which figures, features corresponding to those already described above in relation to the embodiment shown in FIGS. 1 to 4 are labelled with like reference numerals, increased by 200. FIG. 9 should be contrasted with FIG. 2 and FIG. 10 should be contrasted with FIG. 3. The main difference between the sander 210 shown in FIGS. 9A, 9B and 10 and that shown in FIGS. 1 to 4 is that whereas the sander 10 of FIGS. 1 to 4 is designed to be held by a user in a palm grip, whereby a user places the palm of his or her hand around the top of the sander in order to use it, the sander shown in FIGS. 9A, 9B and 10 is designed to be held by a user in a pistol grip. To this end, in comparison to the sander shown in FIGS. 1 to 4, the dust collection chamber 230 of sander 210 is located further away from main body 212 than the dust collection chamber 30 of sander 10 is located in relation to the main body 12 thereof, so that a hole 268 is provided between main body 212 and dust collection chamber 230, as may best be seen in FIG. 10. This allows a user to pass their hand around the upper surface of sander 210 and through hole 268 in a pistol grip. However, a consequence of the increased distance between dust collection chamber 230 and main body 212 of sander 210 in comparison to that between dust collection chamber 30 and main body 12 of sander 10 is that first, drive wheel 240 of sander 210 is also located further from the second, driven wheel 242 thereof than first, drive wheel 40 of sander 10 is located from the second, driven wheel 42 thereof, thereby also necessitating the use of a longer drive belt 250 than drive belt 50. In order to prevent drive belt 250 from becoming slack and vibrating between drive and driven wheels 240, 242, the dust extraction system of sander 210 is therefore also provided with a pair of additional idler wheels 266 to guide drive belt 250, as may best be seen in the top-plan view of FIG. 9B.

Figure 11:
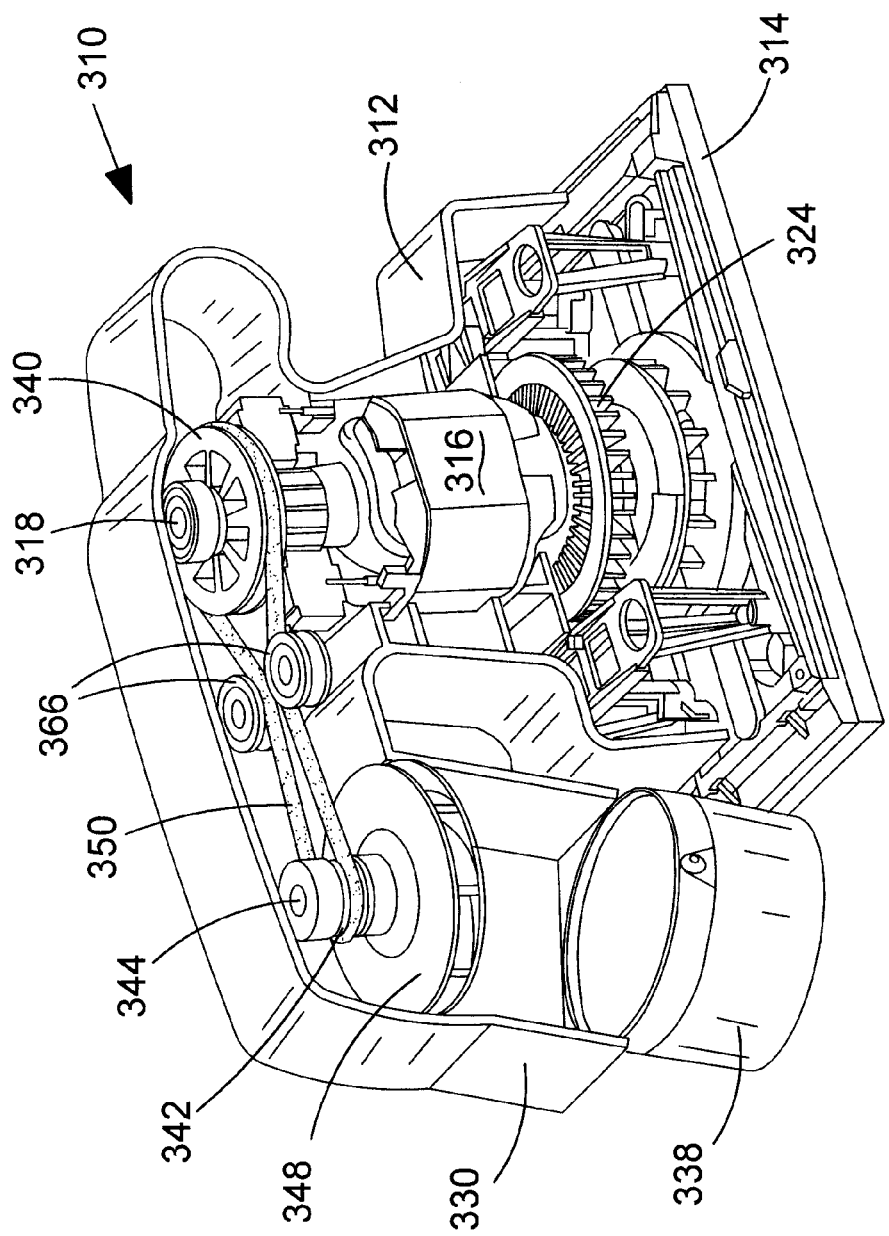
FIG. 11 is a cut-away view from above and one side of a sander having a dust extraction system, which is a power tool according to a fourth embodiment of the invention.

FIG. 11 show a sander 310 according to a fourth embodiment of the invention, in which figures, features corresponding to those already described above in relation to the embodiment shown in FIGS. 1 to 4 are labelled with like reference numerals, increased by 300. Like the sander 210 shown in FIGS. 9A, 9B and 10, the dust extraction system of sander 310 is also provided with a pair of idler wheels 366 to guide drive belt 350. The other main point of difference between the sander 310 shown in FIG. 11 and that shown in FIGS. 1 to 4 is that whereas the dust collection chamber 30 of sander 10 is oriented substantially vertically with respect to the power tool, the dust collection chamber 330 of sander 310 is instead oriented at an oblique angle with respect to the power tool. This has the advantage of giving sander 310 greater compactness compared to sander 10. It should be pointed out that since FIG. 11 is a cut-away view of sander 310, certain features of the dust extraction system of sander 310, such as the filter thereof, are not shown in FIG. 11, but that in spite of this, the dust extraction system of sander 310 does indeed comprise such a filter and is in all other respects similar to the dust extraction system of sander 10 with the addition of idler wheels 366 and the oblique orientation of the dust collection chamber 330. The oblique orientation of the dust collection chamber 330 with respect to the power tool does not hamper the operation of the dust extraction system in any way, since the cyclonic action which serves to separate dust from the dust-laden air entering dust collection chamber 330, and which is generated as a result of the rotation of fan 348 as already described above in relation to FIG. 1, is much more powerful than the small component of the gravitational field now acting on the swirling dust, as a result of the oblique orientation of dust collection chamber 330.

Figure 12:
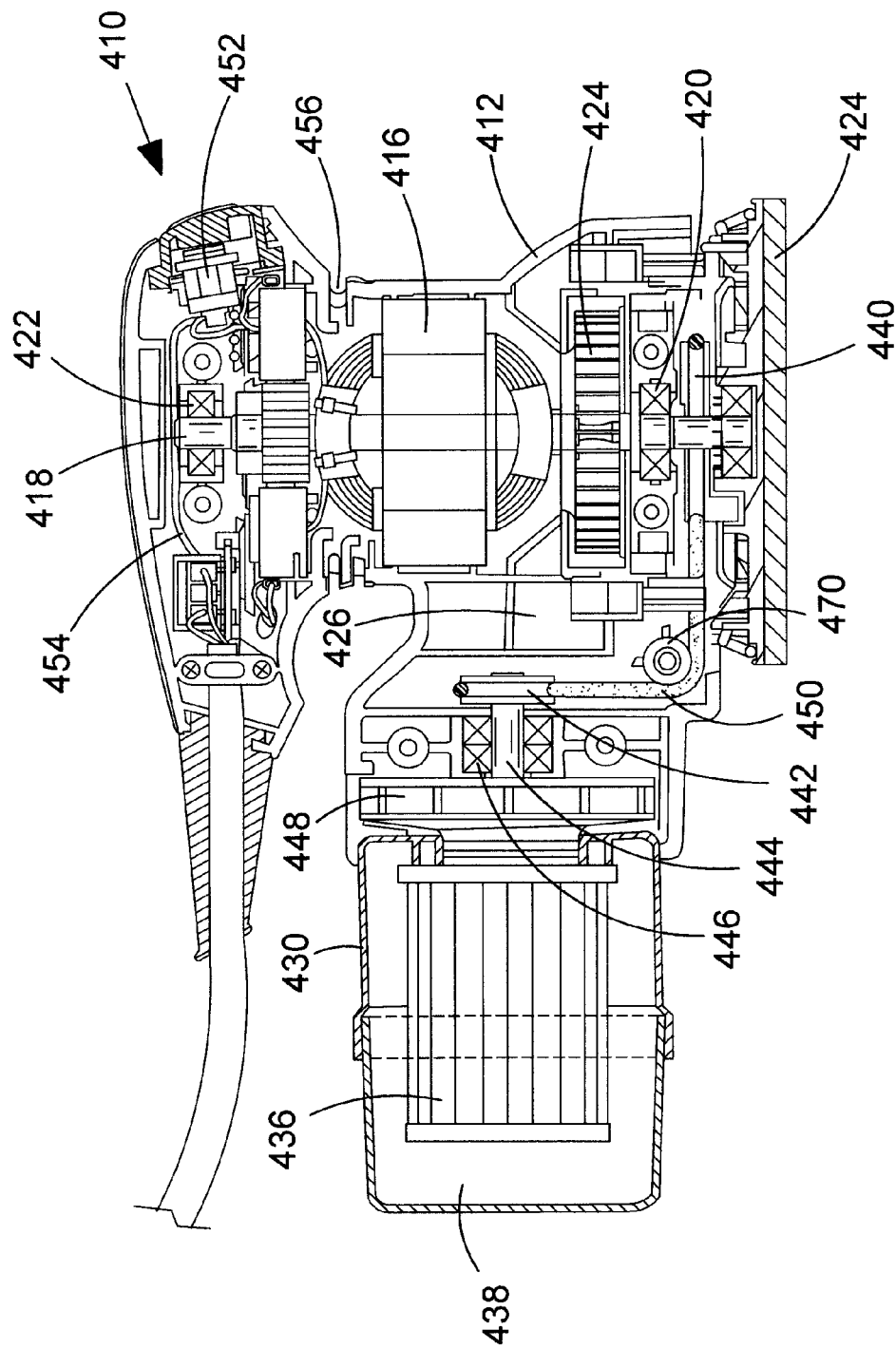
FIG. 12 is a sectional view through the side of a sander having a dust extraction system, which is a power tool according to a fifth embodiment of the invention.
Figure 13:
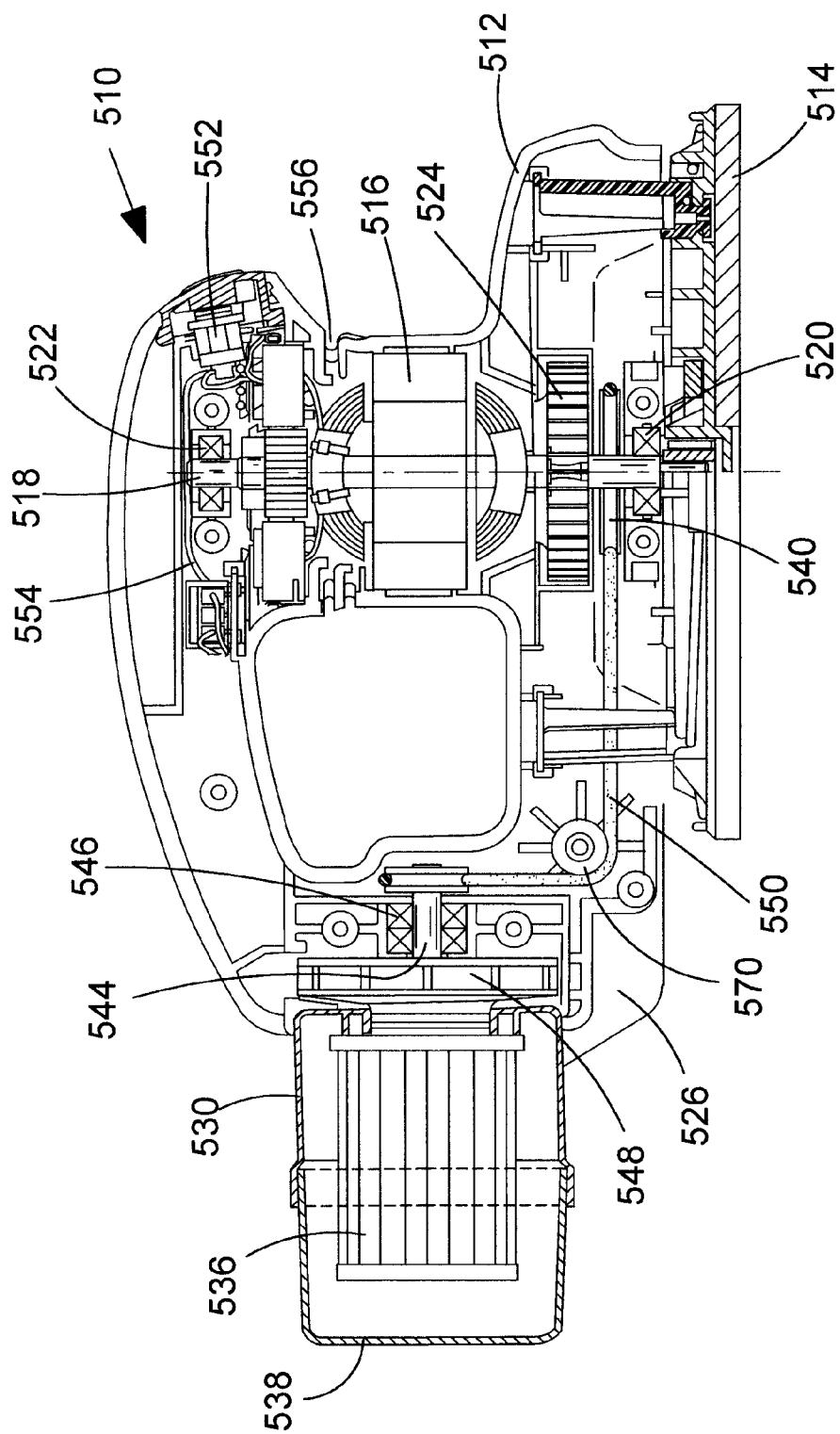
FIG. 13 is a sectional view through the side of a sander having a dust extraction system, which is a power tool according to a sixth embodiment of the invention.

Indeed, as will now be described in relation to FIGS. 12 and 13, the dust collection chamber may even be oriented in a substantially horizontal direction relative to the power tool without affecting the operation of the dust extraction system. FIG. 12 therefore shows a sander 410 according to a fourth embodiment of the invention and FIG. 13 shows a sander 510 according to a fifth embodiment of the invention, in both of which the dust collection chamber is oriented in a horizontal direction. FIG. 12 should be contrasted with FIG. 2, with those features in FIG. 12 corresponding to features already described above in relation to the embodiment shown in FIG. 2 labelled with like reference numerals, increased by 400. FIG. 13 should instead be contrasted with FIG. 9A, with those features in FIG. 13 corresponding to features already described above in relation to the embodiment shown in FIG. 9A labelled with like reference numerals, increased by 300. Thus the sander 410 of FIG. 12 is designed to be held by a user in a palm grip, like the sander 10 of FIG. 2, but the sander 510 of FIG. 13 is provided with a hole 568 between main body 512 and dust collection chamber 530 and is designed to be held by a user in a pistol grip. However, in both the sander 410 of FIG. 12 and the sander 510 of FIG. 13, the dust collection chambers 430, 530 respectively are oriented substantially horizontally with respect to the power tool 410, 510. In order to accommodate this new orientation of the dust collection chamber, and therefore also of the fan 448, 548 of the dust collection system in each case, the rotational movement of the motor drive shaft 418, 518 must be redirected along a horizontal axis. This is achieved by providing the dust extraction system in each sander 410, 510 with an extra pulley 470, 570 respectively, about which the respective drive belts 450, 550 are able to pass from a horizontal orientation to a vertical orientation, thereby also allowing for a vertical orientation of the respective second, driven wheels 442, 542, and hence of the respective fans 448, 548 as well.

Whereas all of the illustrative embodiments described above in relation to the drawings have comprised a dust collection chamber having a filter located in fluid flow between the inlet of the dust collection chamber and atmospheric air, wherein the filter is located centrally within the dust collection chamber coaxially with the axis of the dust collection chamber, such a filter is not an essential element of the invention. Instead, the dust extraction system of the invention may also be implemented with a dust collection chamber having a purely cyclonic separation of dust from dust-laden air entering the dust collection chamber without additional filtering before clean air is expelled from the outlet of the dust collection chamber to atmospheric air. This is because the ratio of the diameters of the first, drive wheel mounted on the motor output shaft and the second driven, wheel mounted on the second shaft may be made sufficiently great that the fan also mounted on the second shaft rotates at such a speed that air is also caused to rotate in the dust collection chamber by said fan in a true cyclone, thereby performing an efficient separation of dust from the air in the dust collection chamber, without the need for extra filtering.

Moreover, whereas all of the illustrative embodiments described above in relation to the drawings have been sanders, a power tool comprising a dust extraction system according to the invention may be any other type of power tool which generates dust and/or debris during use, such as a drill, saw, angle grinder or router.

The invention claimed is:

1. A power tool comprising:
a working head for holding a working element;
a motor having a motor output shaft for driving said working head;
a duct having an inlet locatable in proximity to a point of contact between the working element and a workpiece;
a dust collection chamber having an inlet in fluid communication with an outlet from said duct, and an outlet in fluid communication with atmospheric air; and
a fan operable to transport air from the inlet of said duct to the inlet of said dust collection chamber;
a first wheel mounted on the motor output shaft;
a second wheel mounted on a second shaft; and
a drive belt connecting the first wheel to the second wheel, for transmitting power from the motor output shaft to the second shaft;
wherein the fan is mounted on the second shaft; and
wherein the first wheel and the working head are located on opposite sides of the motor.

2. A power tool according to claim 1, wherein the dust collection chamber has a longitudinal axis and a substantially circular cross section about the axis, the inlet to the dust collection chamber being at a perimeter of said circular cross section and the outlet of said dust collection chamber being near a center of said circular cross section; and
wherein the power tool further comprises a filter located in fluid flow between the inlet of said dust collection chamber and atmospheric air.

3. A power tool according to claim 2, wherein the axis of the dust collection chamber is oriented at an oblique angle with respect to an axis defined by the motor output shaft.

4. A power tool according to claim 2, wherein the axis of the dust collection chamber is oriented substantially horizontally in a direction substantially perpendicular to an axis of the motor and the power tool further comprises a pulley about which the drive belt is able to pass from a horizontal to a vertical orientation.

5. A power tool according to claim 1, wherein the first wheel has a larger diameter than the second wheel.

6. A power tool according to claim 1, further comprising another fan mounted on the motor output shaft and operable to cool said motor, said other fan being contained in a chamber of said power tool which is sealed from fluid communication with said duct, but which is in fluid communication with atmospheric air via a vent.

7. A power tool according to claim 1, wherein the working head comprises a quick-release mechanism for holding a working element, and a bottom portion of the dust collection chamber is provided with a clearance (C) above a lower surface of the working head.

8. A power tool according to claim 1, wherein the first wheel, the second wheel and the drive belt are contained within a compartment of a main body of the power tool, said compartment having a removable cover.

9. A power tool according to claim 8, wherein the main body of the power tool is provided with mounting parts for receiving said cover in a snap-fit manner.

10. A power tool according to claim 1, further comprising an idler wheel located between the first wheel and the second wheel to the guide drive belt therebetween.

11. A power tool according to claim 1, wherein the power tool is a sander, the working head is a platen, and the working element is a sheet of sandpaper.

12. A power tool according to claim 1, wherein the power tool is a drill, the working head is a chuck and the working element is a drill bit.

13. A power tool according to claim 1, wherein the power tool is a saw, the working head is a blade clamp and the working element is a saw blade.

14. A power tool according to claim 1, wherein the power tool is an angle grinder, the working head is a spindle and the working element is a grinding wheel or disc.

15. A power tool according to claim 1, wherein the power tool is a router, the working head is a chuck and the working element is a router bit.

16. A power tool comprising:
a working head for holding a working element;
a motor having a motor output shaft for driving said working head, the motor output shaft having a first portion located on a first side of the motor and a second portion located on a second side of the motor;
a duct having an inlet;
a dust collection chamber having an inlet in fluid communication with an outlet from said duct, and an outlet in fluid communication with atmospheric air; and
a fan operable to transport air from the inlet of said duct to the inlet of said dust collection chamber;
wherein the motor is operably connected to the fan and the motor drives the fan at a different rate of speed than the working head;
the power tool further comprising a drive wheel mounted on the motor output shaft;
a driven wheel mounted on a second shaft;
a drive belt connecting the drive wheel to the driven wheel, for transmitting power from the motor output shaft to the second shaft;
wherein the fan is mounted on the second shaft; and
wherein the working head is disposed on the first portion of the motor output shaft and the drive wheel is disposed on the second portion of the motor output shaft.

17. The power tool of claim 16, wherein the dust collection chamber has a substantially circular cross section about an axis, the inlet to the dust collection chamber being at a perimeter of said circle and the outlet of said dust collection chamber being drawn from within said circle, in a region of said axis.

18. The power tool according to claim 16, wherein the drive wheel has a larger diameter than the driven wheel.

19. A power tool comprising:
a housing;
a working head for holding a working element;
a motor oriented vertically in the housing and operable to drive said working head;
a dust collection chamber having an inlet for receiving dust from an area near the working head;
a fan operable to draw air into the dust collection chamber; and
a linkage for transmitting power from the motor to the fan;
wherein the working head is located below the motor and the linkage is located above the motor.

20. The power tool according to claim 19, wherein the linkage comprises a drive belt.

21. The power tool according to claim 19, wherein the motor has a longitudinal axis and the working head lies in a plane perpendicular to the longitudinal axis of the motor.

\* \* \* \* \*